(12) United States Patent  
Epstein et al.

(10) Patent No.: US 12,662,166 B2  
(45) Date of Patent: Jun. 23, 2026

(54) SYSTEM AND METHOD FOR LANE ASSOCIATION/TRANSITION ASSOCIATION WITH SPLINES

(71) Applicant: TOYOTA RESEARCH INSTITUTE, INC., Los Altos, CA (US)

(72) Inventors: Noah J. Epstein, Cambridge, MA (US); Namrata Bhakta, Santa Clara, CA (US); Kevin W. Zhang, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 418 days.

(21) Appl. No.: 17/697,762

(22) Filed: Mar. 17, 2022

(65) Prior Publication Data

US 2023/0294742 A1     Sep. 21, 2023

(51) Int. Cl.

| | |
|---|---|
| *B60W 60/00* | (2020.01) |
| *G06T 7/70* | (2017.01) |
| *G06V 10/44* | (2022.01) |
| *G06V 20/56* | (2022.01) |
| *G06V 20/58* | (2022.01) |

(52) U.S. Cl.  
CPC ......... *B60W 60/00276* (2020.02); *G06T 7/70* (2017.01); *G06V 10/44* (2022.01); *G06V 20/58* (2022.01); *G06V 20/588* (2022.01); *B60W 2552/05* (2020.02); *B60W 2552/30* (2020.02); *B60W 2554/4044* (2020.02); *G06T 2207/30252* (2013.01)

(58) Field of Classification Search  
CPC ......... B60W 2552/05; B60W 2552/30; B60W 2554/4044; B60W 60/00276; B60W 30/18159; B60W 60/0027; G06T 2207/30252; G06T 7/70; G06V 10/44; G06V 20/58; G06V 20/588; G06V 10/82  
See application file for complete search history.

(56) References Cited

U.S. PATENT DOCUMENTS

| | | | |
|---|---|---|---|
| 9,511,767 | B1 | 12/2016 | Okumura et al. |
| 10,152,882 | B2 | 12/2018 | Zhao et al. |
| 10,486,707 | B2 | 11/2019 | Zelman et al. |

(Continued)

OTHER PUBLICATIONS

Schrier, et al., "An Integrated Approach to Maneuver-Based Trajectory Prediction and Criticality Assessment in Arbitrary Road Environments", IEEE Transactions on Intelligent Transportation Systems 17(10):2751-2766, Oct. 2016.

(Continued)

*Primary Examiner* — Adnan M Mirza  
(74) *Attorney, Agent, or Firm* — SEYFARTH SHAW LLP

(57) ABSTRACT

A method for vehicle behavior prediction is described. The method includes detecting a vehicle entering an unmarked road segment. The method also includes determining a set of exit paths available for the detected vehicle to reach different exit lanes of the unmarked road segment. The method further includes predicting an exit path taken by the detected vehicle from the set of exit paths available for the detected vehicle to reach the different exit lanes of the unmarked road segment. The method also includes planning a trajectory of an ego vehicle according to the predicted exit path taken by the detected vehicle to reach an exit lane of the unmarked road segment.

18 Claims, 7 Drawing Sheets

(56)  References Cited

U.S. PATENT DOCUMENTS

| | | | | | |
|---|---|---|---|---|---|
| 2004/0044465 | A1* | 3/2004 | Nesbitt | ................ | G06Q 10/047 |
| | | | | | 701/533 |
| 2015/0153735 | A1* | 6/2015 | Clarke | ................... | G01C 11/04 |
| | | | | | 701/301 |
| 2019/0033882 | A1* | 1/2019 | Collett | ................. | G05D 1/0088 |
| 2021/0181749 | A1* | 6/2021 | Pan | .................... | B60W 60/0011 |
| 2022/0105940 | A1* | 4/2022 | Hartnett | ............. | B60W 60/0011 |
| 2022/0219700 | A1* | 7/2022 | Tsukamoto | .......... | G06V 20/588 |
| 2022/0314999 | A1* | 10/2022 | Williams | ............ | B60W 60/001 |
| 2023/0087496 | A1* | 3/2023 | Hwang | ................ | H04W 4/024 |
| | | | | | 455/456.1 |

OTHER PUBLICATIONS

Jazayeri, et al., "Predicting Vehicular Trajectories at Intersections Using Advanced Machine Learning Techniques," https://trid.trb.org/view/1857669, 2021.

* cited by examiner

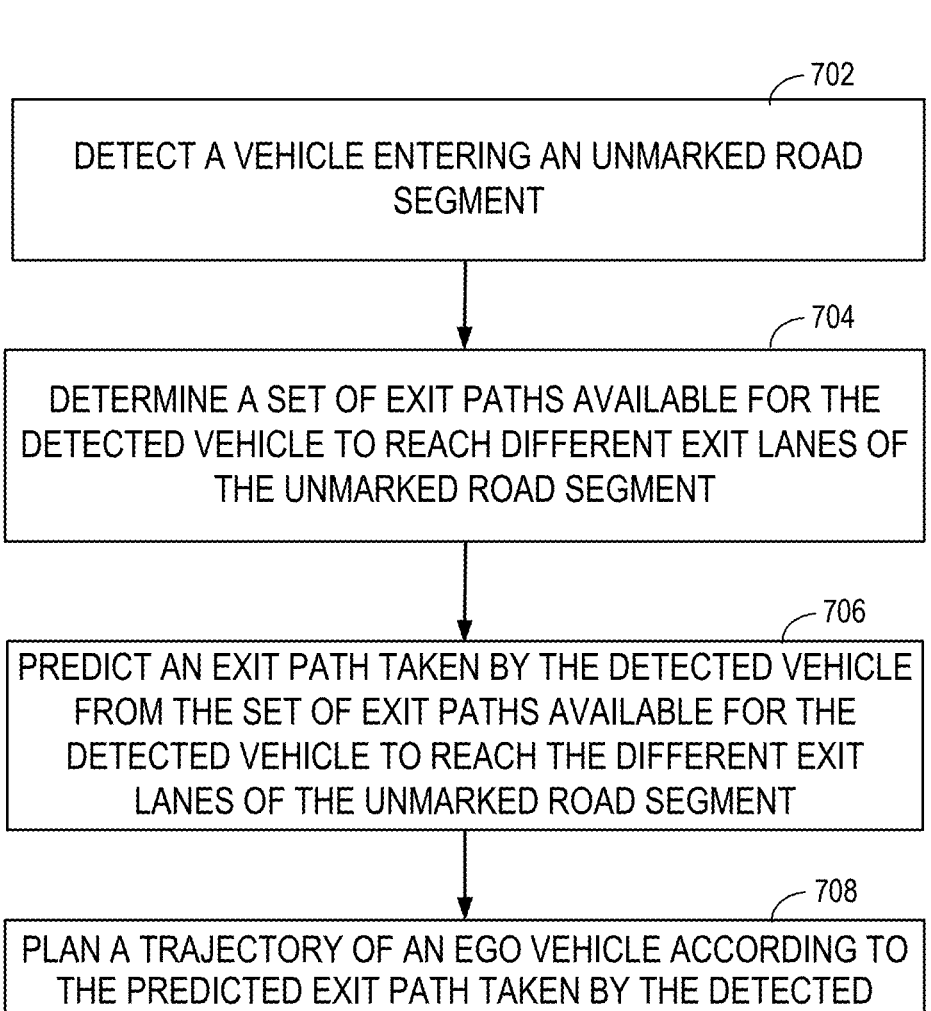

702

DETECT A VEHICLE ENTERING AN UNMARKED ROAD SEGMENT

704

DETERMINE A SET OF EXIT PATHS AVAILABLE FOR THE DETECTED VEHICLE TO REACH DIFFERENT EXIT LANES OF THE UNMARKED ROAD SEGMENT

706

PREDICT AN EXIT PATH TAKEN BY THE DETECTED VEHICLE FROM THE SET OF EXIT PATHS AVAILABLE FOR THE DETECTED VEHICLE TO REACH THE DIFFERENT EXIT LANES OF THE UNMARKED ROAD SEGMENT

708

PLAN A TRAJECTORY OF AN EGO VEHICLE ACCORDING TO THE PREDICTED EXIT PATH TAKEN BY THE DETECTED VEHICLE TO REACH A CORRESPONDING EXIT LANE OF THE UNMARKED ROAD SEGMENT

*FIG. 7*

SYSTEM AND METHOD FOR LANE ASSOCIATION/TRANSITION ASSOCIATION WITH SPLINES

BACKGROUND

Field

Certain aspects of the present disclosure generally relate to autonomous vehicle technology and, more particularly, to lane association/transition association with splines.

Background

Autonomous agents (e.g., vehicles, robots, etc.) rely on machine vision for sensing a surrounding environment by analyzing areas of interest in a scene from images of the surrounding environment. Although scientists have spent decades studying the human visual system, a solution for realizing equivalent machine vision remains elusive. Realizing equivalent machine vision is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and have become a reality in this decade. Because autonomous agents have to interact with humans, however, many critical concerns arise. For example, how to design vehicle control of an autonomous vehicle using machine learning. Unfortunately, vehicle control by machine learning is less effective in complicated traffic environments involving complex interactions between vehicles (e.g., a situation where a controlled (ego) vehicle merges/changes onto/into a traffic lane).

Machine learning techniques for vehicle control using a network to select a vehicle control action (e.g., a selected speed/acceleration/steering angle) of the controlled (ego) vehicle is dependent on predicted actions of other vehicles and pedestrians, especially at intersections. A capability for determining the likelihood that a vehicle chooses a given exit lane from an intersection is desired.

SUMMARY

A method for vehicle behavior prediction is described. The method includes detecting a vehicle entering an unmarked road segment. The method also includes determining a set of exit paths available for the detected vehicle to reach different exit lanes of the unmarked road segment. The method further includes predicting an exit path taken by the detected vehicle from the set of exit paths available for the detected vehicle to reach the different exit lanes of the unmarked road segment. The method also includes planning a trajectory of an ego vehicle according to the predicted exit path taken by the detected vehicle to reach an exit lane of the unmarked road segment.

A non-transitory computer-readable medium having program code recorded thereon for vehicle behavior prediction is described. The program code is executed by a processor. The non-transitory computer-readable medium includes program code to detect a vehicle entering an unmarked road segment. The non-transitory computer-readable medium also includes program code to determine a set of exit paths available for the detected vehicle to reach different exit lanes of the unmarked road segment. The non-transitory computer-readable medium further includes program code to predict an exit path taken by the vehicle from the set of exit paths available for the detected vehicle to reach the different exit lanes of the unmarked road segment. The non-transitory computer-readable medium also includes program code to plan a trajectory of an ego vehicle according to the predicted exit path taken by the vehicle to reach a corresponding exit lane of the unmarked road segment.

A system for vehicle behavior prediction is described. The system includes a vehicle perception module to detect a vehicle entering an unmarked road segment. The system also includes a vehicle paths determination module to determine a set of exit paths available for the detected vehicle to reach different exit lanes of the unmarked road segment. The system further includes a vehicle path prediction module to predict an exit path taken by the vehicle from the set of exit paths available for the detected vehicle to reach the different exit lanes of the unmarked road segment. The system also includes a vehicle trajectory planner module to plan a trajectory of an ego vehicle according to the predicted exit path taken by the vehicle to reach a corresponding exit lane of the unmarked road segment.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7 is a flowchart illustrating a method for vehicle behavior prediction, according to aspects of the present disclosure.

DETAILED DESCRIPTION

Figure 1:
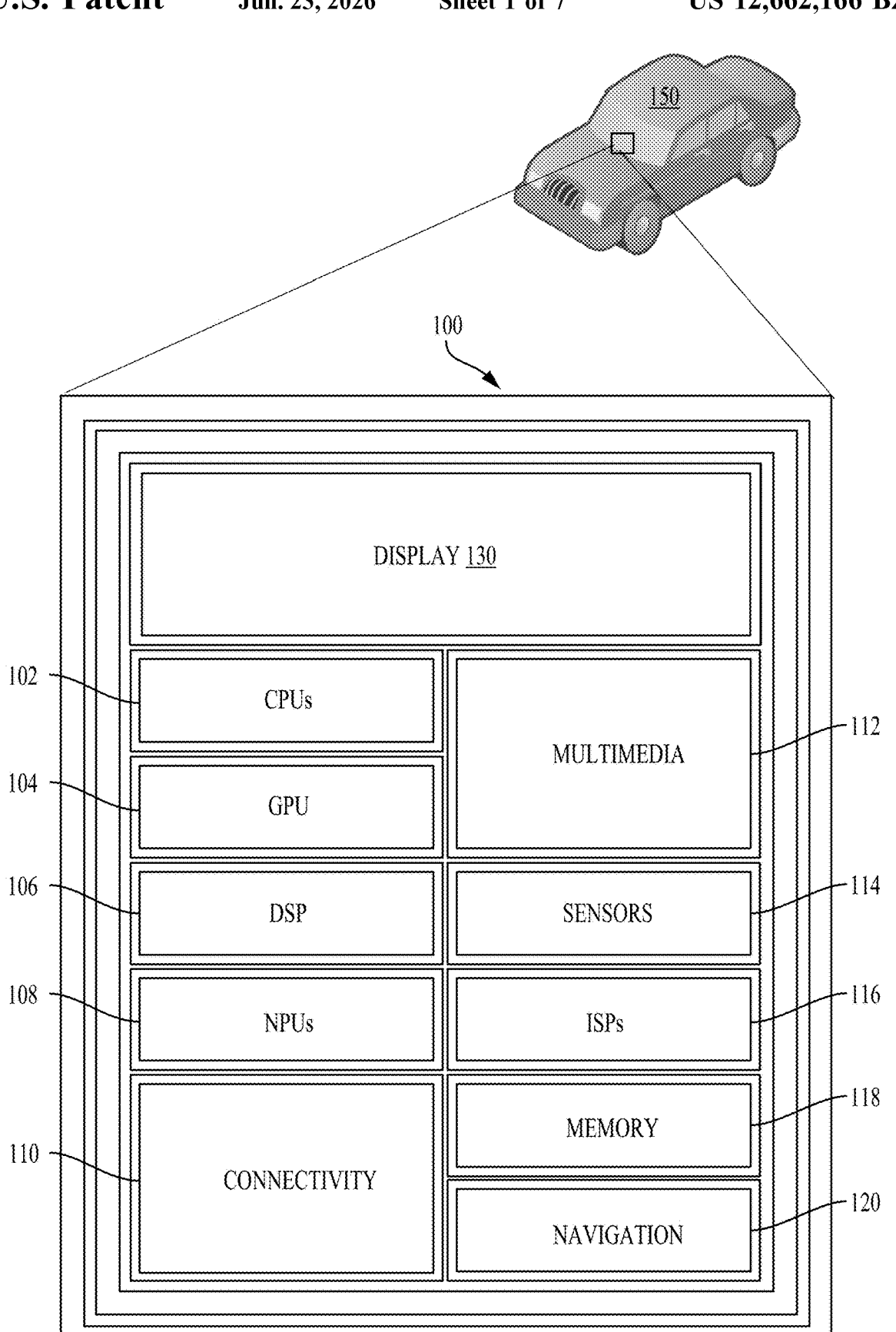
FIG. 1 illustrates an example implementation of designing a neural network using a system-on-a-chip (SOC) for a vehicle behavior planning system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Vehicle planning by machine learning is less effective in complicated traffic environments. For example, these traffic environments may involve complex interactions between vehicles, including situations where a controlled (ego) vehicle maneuvers into and out of traffic lanes (e.g., intersections). Conventional machine learning techniques for planning vehicle control may use a network to plan an appropriate vehicle control action from input data relative to the ego vehicle. For example, a selected speed/acceleration/steering angle of the controlled (ego) vehicle may be planned as a vehicle control action to perform a vehicle control maneuver. Unfortunately, conventional machine learning techniques may be problematic when the ego vehicle encounters a complex intersection.

For example, when an autonomous vehicle (AV) is driving on a roadway, conventional approaches plan actions at discrete time intervals, as determined by a vehicle perception system. The vehicle perception system can include a number of different sensors, such as cameras, a light detection and ranging (LIDAR) sensor or a radio detection and ranging (RADAR) sensor, sonar, or other like sensor. Unfortunately, conventional approaches of planning actions at complex intersections may solely focus the proceeding roads from which detected vehicles enter a complex intersection.

Some aspects of the present disclosure describe a system for determining the likelihood that a vehicle chooses a given exit lane at an intersection. Some intersections are created when two roads cross each other. In these cases, a vehicle approaching the intersection from one of the roads has three choices. The vehicle can go straight, turn left, or turn right. As described, the lane that the vehicle travels to after crossing the intersection is referred to as an "exit lane." In some aspects of the present disclosure, the likelihood that a vehicle utilizes a particular exit lane is determined by ranking on one or more calculated splines based on the particular exit lane and a current vehicle position. In one configuration, the system is mounted within a vehicle having sensors (e.g., camera/radar/sonar/LIDAR), which are provided to an object detection and tracking system to determine the location and heading of a particular vehicle.

FIG. 1 illustrates an example implementation of the aforementioned system and method for a vehicle behavior planning system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102 or the NPU 108) of the autonomous vehicle 150 may include program code to detect a vehicle entering an unmarked road segment based on images processed by the sensor processor 114. The instructions loaded into the processor may also include program code to determine a set of exit paths available for the detected vehicle to reach different exit lanes of the unmarked road segment. The instructions loaded into a processor may further include program code to predict an exit path taken by the vehicle from the set of exit paths available for the detected vehicle to reach the different exit lanes of the unmarked road segment. The instructions loaded into the processor may also include program code to plan a trajectory of an ego vehicle according to the predicted exit path taken by the vehicle to reach a corresponding exit lane of the unmarked road segment.

Figure 2:
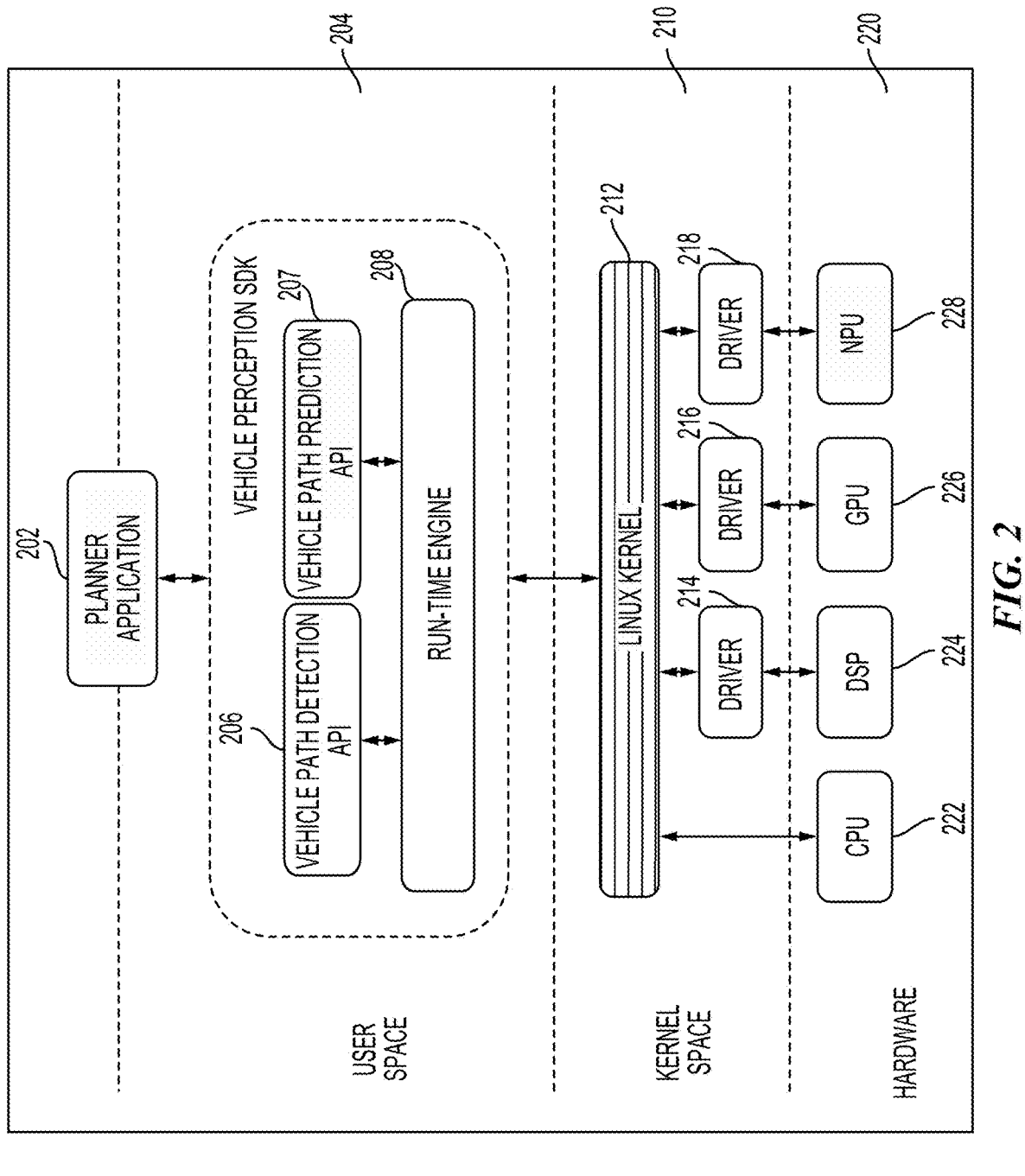
FIG. 2 is a block diagram illustrating a software architecture that may modularize artificial intelligence (AI) functions for a vehicle behavior planning system of an autonomous vehicle, according to aspects of the present disclosure.

FIG. 2 is a block diagram illustrating a software architecture 200 that may modularize artificial intelligence (AI) functions for planning a vehicle control action of an autonomous vehicle based on a predicted path of other vehicles, according to aspects of the present disclosure. Using the architecture, a planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the planner application 202. While FIG. 2 describes the software architecture 200 for planning a vehicle control action of an autonomous vehicle, it should be recognized that vehicle action planning functionality is not limited to autonomous vehicles. According to aspects of the present disclosure, vehicle action planning functionality is applicable to any vehicle type, provided the vehicle is equipped with appropriate functions of an advanced driver assistance system (ADAS).

The planner application 202 may be configured to call functions defined in a user space 204 that may, for example, provide for vehicle action planning services. The planner application 202 may make a request to compile program code associated with a library defined in a vehicle path detection application programming interface (API) 206 to determine a set of exit paths available for a detected vehicle to reach different exit lanes of an unmarked road segment, such as an intersection. The planner application 202 may make a request to compile program code associated with a vehicle path prediction API 207 to predict an exit path taken by the vehicle from the set of exit paths available for the detected vehicle to reach the different exit lanes of the unmarked road segment. Prediction of the path taken by the detected vehicle behavior may ultimately rely on the output of a convolutional neural network configured to plan a trajectory of an ego vehicle according to the predicted exit path taken by the vehicle to reach a corresponding exit lane of the unmarked road segment.

A run-time engine 208, which may be compiled code of a runtime framework, may be further accessible to the planner application 202. The planner application 202 may cause the run-time engine 208, for example, to take actions for controlling the autonomous vehicle. When an ego vehicle intends to enter an intersection, the run-time engine 208 may in turn send a signal to an operating system 210, such as a Linux Kernel 212, running on the SOC 220. FIG. 2 illustrates the Linux Kernel 212 as software architecture for implementing control planning of an autonomous agent using predicted paths of detected vehicles. It should be recognized, however, aspects of the present disclosure are not limited to this exemplary software architecture. For example, other kernels may be used to provide the software architecture to support vehicle control planning functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
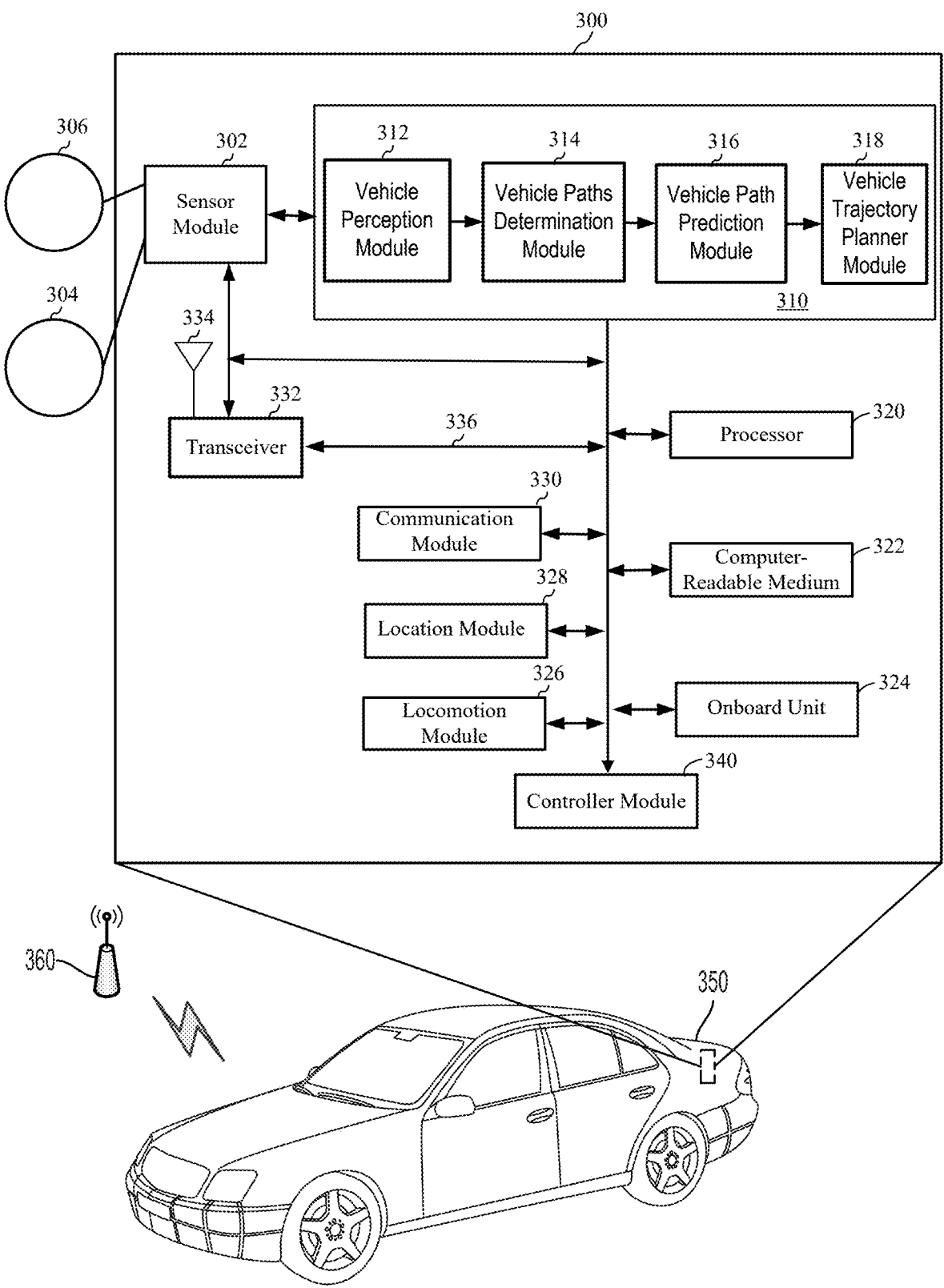
FIG. 3 is a diagram illustrating an example of a hardware implementation for a vehicle behavior planning system, according to aspects of the present disclosure.

FIG. 3 is a diagram illustrating an example of a hardware implementation for a vehicle behavior planning system 300, according to aspects of the present disclosure. The vehicle behavior planning system 300 may be configured for improved path identification of detected vehicles at entering an unmarked road segment, such as an intersection. The vehicle behavior planning system 300 may be a component of an autonomous vehicle, or other non-autonomous device (e.g., non-autonomous vehicles, ride-share cars, etc.). For example, as shown in FIG. 3, the vehicle behavior planning system 300 is a component of a car 350.

Aspects of the present disclosure are not limited to the vehicle behavior planning system 300 being a component of the car 350. Other devices, such as a bus, motorcycle, or other like non-autonomous vehicle, are also contemplated for implementing the vehicle behavior planning system 300. In this example, the car 350 may be autonomous or semi-autonomous; however, other configurations for the car 350 are contemplated, such as an advanced driver assistance system (ADAS).

The vehicle behavior planning system 300 may be implemented with an interconnected architecture, represented generally by an interconnect 336. The interconnect 336 may include any number of point-to-point interconnects, buses, and/or bridges depending on the specific application of the vehicle behavior planning system 300 and the overall design constraints. The interconnect 336 links together various circuits including one or more processors and/or hardware modules, represented by a sensor module 302, a vehicle behavior planner 310, a processor 320, a computer-readable medium 322, an onboard unit 324, a locomotion module 326, a location module 328, a communication module 330, and a controller module 340. The interconnect 336 may also link various other circuits such as timing sources, peripherals, voltage regulators, and power management circuits, which are well known in the art, and therefore, will not be described any further.

The vehicle behavior planning system 300 includes a transceiver 332 coupled to the sensor module 302, the vehicle behavior planner 310, the processor 320, the computer-readable medium 322, the onboard unit 324, the locomotion module 326, the location module 328, the communication module 330, and the controller module 340. The transceiver 332 is coupled to an antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle behavior planner 310 to/from connected vehicles within the vicinity of the car 350.

The vehicle behavior planning system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle behavior planning system 300 to perform the various functions described for vehicle behavior planning (e.g., vehicle intersection control planning) of the car 350, or any of the modules (e.g., 302, 310, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle behavior planner 310, the onboard unit 324, the locomotion module 326, the location module 328 the communication module 330, and/or the controller module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication-Physical layer using microwave at 5.8 GHz (review); EN 12795: 2002 Dedicated Short-Range Communication (DSRC) DSRC Data link layer: Medium Access and Logical Link Control (review); EN 12834:2002 Dedicated Short-Range Communication-Application layer (review); EN 13372: 2004 Dedicated Short-Range Communication (DSRC)-DSRC profiles for RTTT applications (review); and EN ISO 14906:2004 Electronic Fee Collection-Application interface.

The communication module 330 may facilitate communications via the transceiver 332. For example, the communication module 330 may be configured to provide communication capabilities via different wireless protocols, such as 5G, WiFi, long term evolution (LTE), 4G, 3G, etc. The communication module 330 may also communicate with other components of the car 350 that are not modules of the vehicle behavior planning system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle behavior planning system 300 also includes the vehicle behavior planner 310 for planning a route and controlling the locomotion of the car 350, via the locomotion module 326 for autonomous operation of the car 350. In one configuration, the vehicle behavior planner 310 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle behavior planner 310 may be in communication with the sensor module 302, the processor 320, the computer-readable medium 322, the onboard unit 324, the locomotion module 326, the location module 328, the communication module 330, the transceiver 332, and the vehicle behavior planner 310. In one configuration, the vehicle behavior planner 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle behavior planner 310 may receive sensor data directly from the first sensor 306 and the second sensor 304 to determine, for example, input traffic data images.

Vehicle planning by machine learning is less effective in complicated traffic environments. For example, these traffic environments may involve complex interactions between vehicles, including situations where an ego vehicle (e.g., the car 350) maneuvers into and out of traffic lanes (e.g., intersections). Conventional machine learning techniques for planning vehicle control may use a network to plan an appropriate vehicle control action from input data relative to the car 350. For example, a selected speed/acceleration/ steering angle of the car 350 may be planned as a vehicle control action to perform a vehicle control maneuver. Unfortunately, conventional machine learning techniques may be problematic when the car 350 encounters a complex intersection.

For example, when an autonomous vehicle (AV), such as the car 350, is driving on a roadway, conventional approaches plan actions at discrete time intervals, as determined by a vehicle perception system. The vehicle perception system can include a number of different sensors, such as cameras, a light detection and ranging (LIDAR) sensor or a radio detection and ranging (RADAR) sensor, sonar, or other like sensor. Unfortunately, conventional approaches of planning actions at complex intersections may solely focus the proceeding roads from which detected vehicles enter a complex intersection.

Some aspects of the present disclosure describe a system for determining the likelihood that a detected vehicle chooses a given exit lane at an intersection. Some intersections are created when two roads cross each other. In these cases, a detected vehicle approaching the intersection from one of the roads has three choices. The vehicle can go straight, turn left, or turn right. As described, the lane the vehicle travels to after crossing the intersection is referred to as an "exit lane." In some aspects of the present disclosure, the likelihood that a detected vehicle utilizes a particular exit lane is determined by ranking on one or more calculated splines based on the particular exit lane and a current vehicle position. In one configuration, the system is mounted within the car 350 having the sensor module (e.g., camera/radar/ sonar/LIDAR), which are provided to an object detection and tracking system (e.g., a vehicle perception module 312) to determine the location and heading of a detected vehicle.

As shown in FIG. 3, the vehicle behavior planner 310 includes a vehicle perception module 312, a vehicle paths determination module 314, a vehicle path prediction module 316, and a vehicle trajectory planner module 318. The vehicle perception module 312, the vehicle paths determination module 314, the vehicle path prediction module 316, and the vehicle trajectory planner module 318 may be components of a same or different artificial neural network, such as a deep convolutional neural network (CNN). The vehicle behavior planner 310 is not limited to a CNN.

Some aspects of the present disclosure include a process for training a model of the vehicle behavior planner 310 to predict the exit path taken by a detected vehicle to reach an exit lane of an unmarked road segment based on a curvature of the different exit lanes of the unmarked road segment in relation to the detected vehicle. The vehicle behavior planner 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The vehicle perception module 312 may be configured to detect a vehicle entering an unmarked road segment based on images from the sensor module 302. The vehicle paths determination module 314 may be configured to determine a set of exit paths available for the detected vehicle to reach different exit lanes of the unmarked road segment. In these aspects of the present disclosure, the vehicle path prediction module 316 is configured to predict an exit path taken by the detected vehicle from the set of exit paths available for the detected vehicle to reach the different exit lanes of the unmarked road segment. Once the exit path taken by the detected vehicle is predicted, the vehicle trajectory planner module 318 performs motion planning a trajectory of the car 350 for maneuvering to avoid the predicted path taken by a detected vehicle to reach an exit lane of the unmarked road segment (e.g., an intersection), as shown in FIG. 4.

Figure 4:
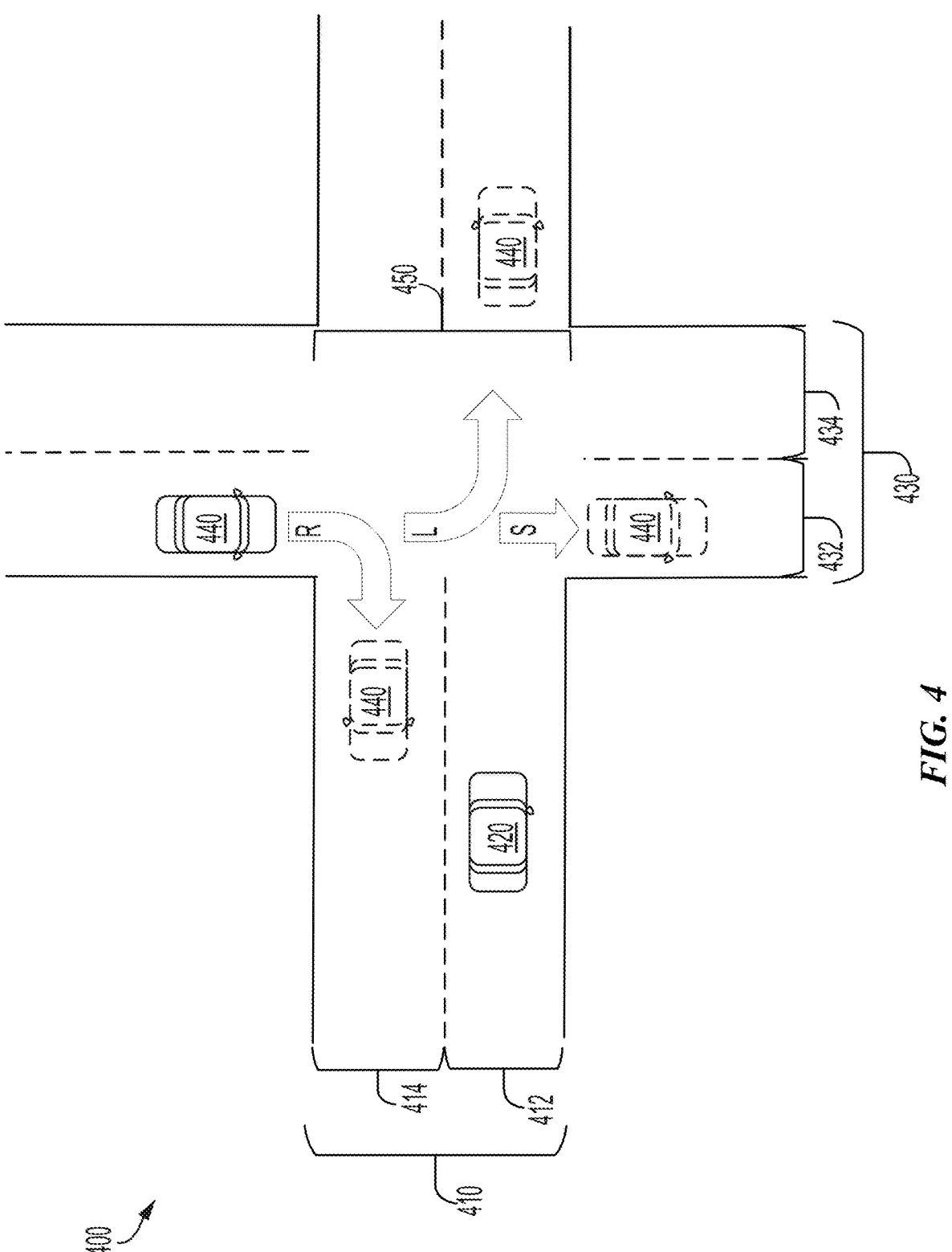
FIG. 4 is a diagram illustrating an overview of a roadway environment, including an ego vehicle in the first lane of the roadway and a detected vehicle approaching an intersection, according to aspects of the present disclosure.

FIG. 4 is a diagram illustrating an overview of a roadway environment, including an ego vehicle in the first lane of the roadway and a detected vehicle approaching an intersection, according to aspects of the present disclosure. In this example, a roadway environment 400 includes a first roadway 410, having a first lane 412 in which an ego vehicle 420 is traveling and a second lane 414. In addition, the roadway environment 400 includes a second roadway 430, having a first lane 432 in which a detected vehicle 440 is traveling and a second lane 434. In this example, the detected vehicle 440 approaching the intersection 450 from the second roadway 430 has three choices. The detected vehicle 440 can go straight on the second roadway 430, or turn left or right onto the first roadway 410. The lane that the detected vehicle 440 travels to after crossing the intersection 450 is referred to as the "exit lane." Detecting the exit lane used by the detected vehicle becomes more complex as the traffic environments become more complex, for example, as shown in FIG. 5.

Figure 5:
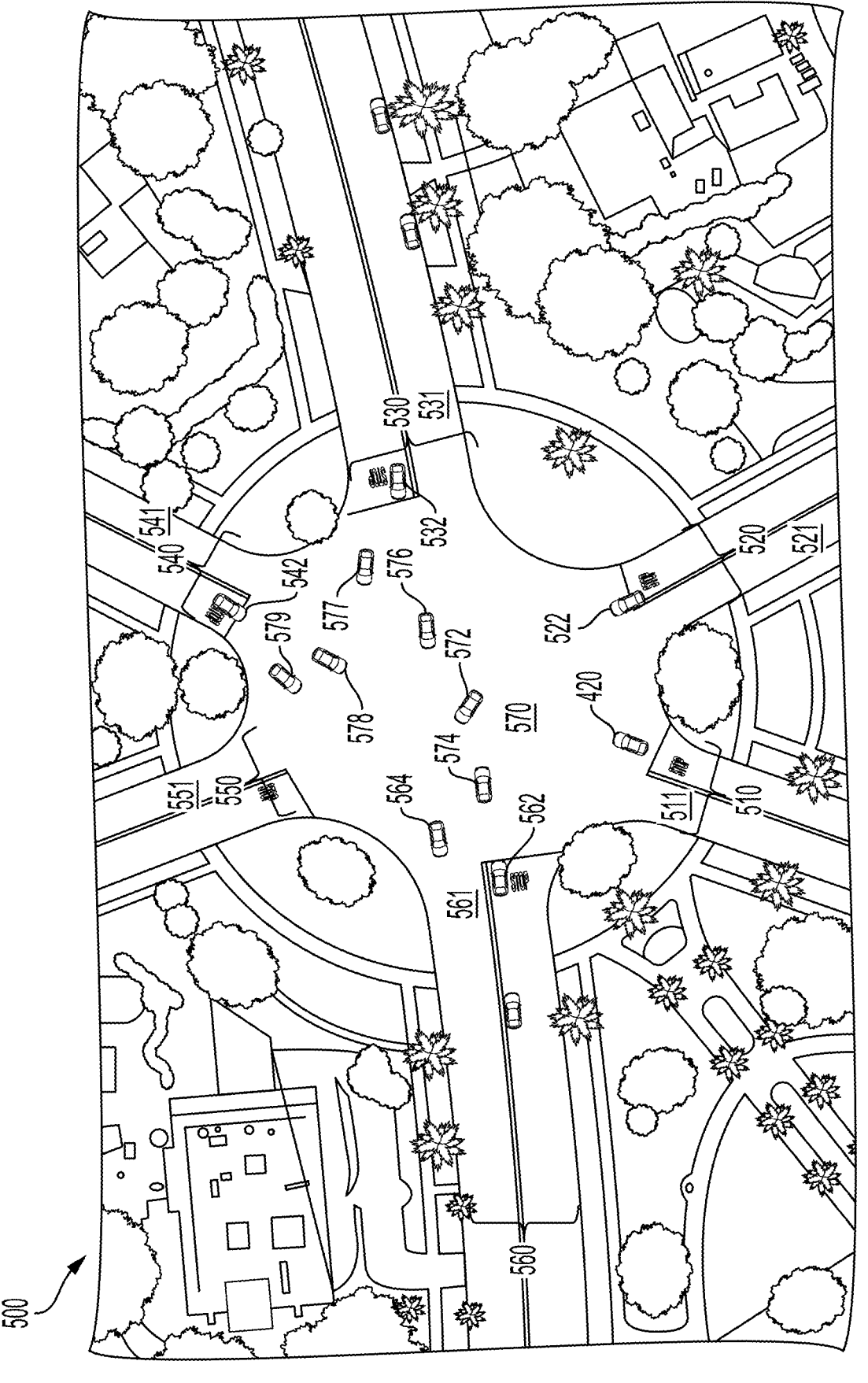
FIG. 5 is a diagram illustrating a birds-eye-view of a roadway environment, including an intersection having several roads crisscrossing each other, according to aspects of the present disclosure.

FIG. 5 is a diagram illustrating a birds-eye-view of a roadway environment, including an intersection having several roads crisscrossing each other, according to aspects of the present disclosure. FIG. 5 illustrates an intersection 570 of a roadway environment 500 having six lanes (e.g., 511, 521, 531, 541, 551, and 561). The six lanes (e.g., 511, 521, 531, 541, 551, and 561) may correspond to a first road 510, a second road 520, a third road 530, a fourth road 540, a fifth road 550, and a sixth road 560. In addition, the first road 510 and the fourth road 540 may correspond to the same road. Similarly, the second road 520 and the fifth road 550 may correspond to the same road. Also, the third road 530 and the sixth road 560 may correspond to the same road.

In some aspects of the present disclosure, an ego vehicle 420 has entered the intersection 570 from the first road 510, in which a first detected vehicle 572 is identified within the intersection 570, and a first vehicle 564 has exited the intersection 570 and is entering the exit lane 561 of the sixth road 560. In this aspect of the present disclosure, the ego vehicle 420 also identifies a second detected vehicle 574, a third detected vehicle 576, a fourth detected vehicle 577, a fifth detected vehicle 578, and a sixth detected vehicle 579 within the intersection 570. This example also illustrates a second vehicle 522 entering the intersection 570 from the second road 520, a third vehicle 532 about to enter the intersection 570 from the third road 530, a fourth vehicle 542 about to enter the intersection 570 from the fourth road 540, and a sixth vehicle 562 about to enter the intersection 570 from the sixth road 560.

In this example, the vehicles approaching the intersection 570 would generally have three choices: (1) go straight; (2) turn left; or (3) turn right. Unfortunately, due to the complexity of the intersection 570, the number of choices is six, which corresponds to the six exit lanes (e.g., 511, 521, 531, 541, 551, and 561). In some aspects of the present disclosure, the likelihood that a vehicle will utilize one of the exit lanes (e.g., 511, 521, 531, 541, 551, and 561) is determined by ranking on one or more calculated splines based on the particular exit lane and a current vehicle position. Detecting the exit lane used by a detected vehicle in the roadway environment 500 is further illustrated, for example, as shown in FIG. 6.

Figure 6:
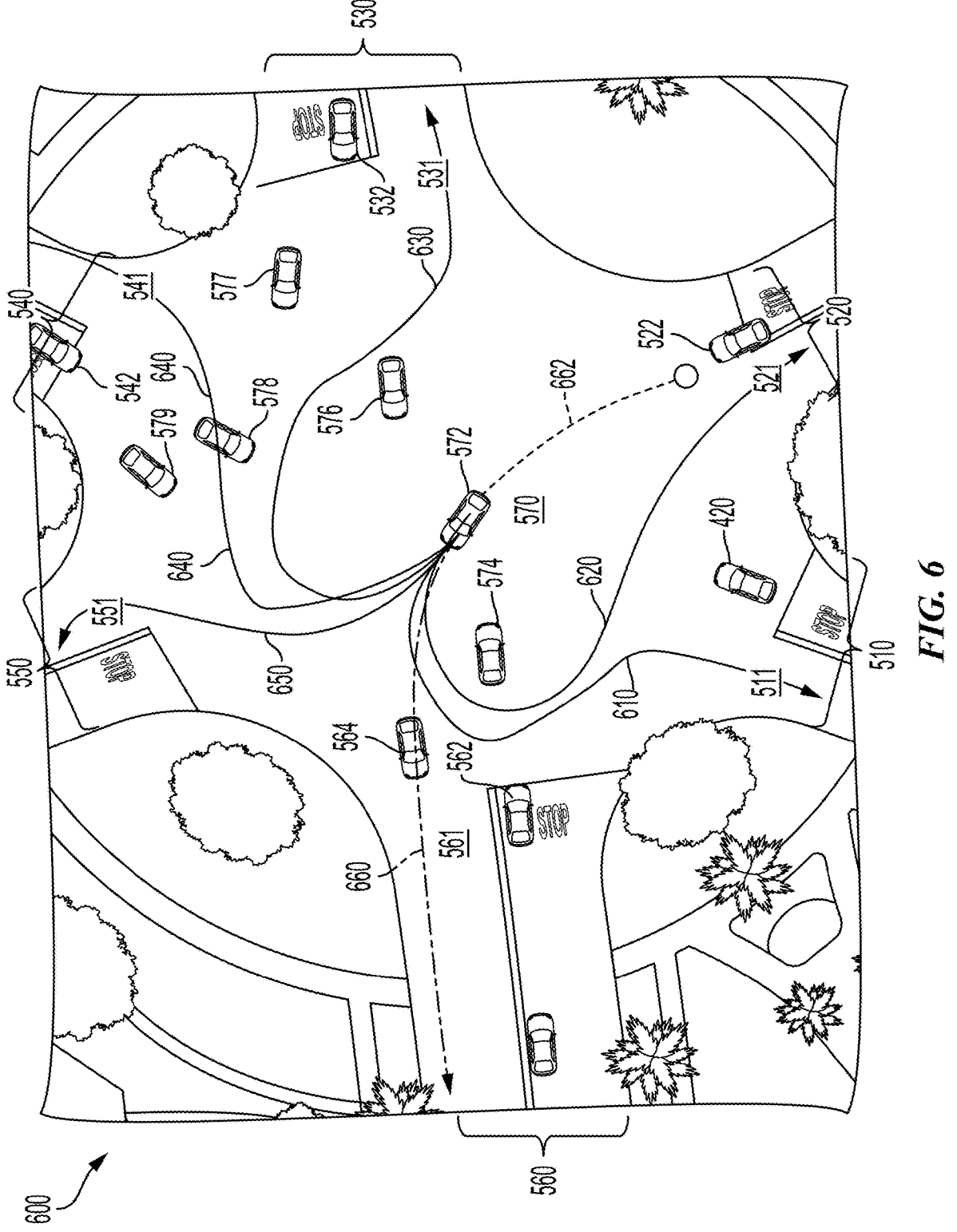
FIG. 6 is a diagram further illustrating the birds-eye-view of the roadway environment of FIG. 5, in which an exit lane of a detected vehicle is determined, according to aspects of the present disclosure.

FIG. 6 is a diagram 600 further illustrating the birds-eye-view of the roadway environment 500 of FIG. 5, in which an exit lane of a detected vehicle is determined, according to aspects of the present disclosure. As shown in FIG. 6, several different paths are determined that the first detected vehicle 572 can take to each of the exit lanes (e.g., 511, 521, 531, 541, 551, and 561) as the first detected vehicle 572 enters the intersection 570. For example, a first path 610 may correspond to the exit lane 511 of the first road 510, and a second path (not shown) may correspond to the exit lane 521 of the second road 520, if the first detected vehicle 572 performs a U-turn. In addition, a third path 630 may correspond to the exit lane 531 of the third road 530, a fourth path 640 may correspond to the exit lane 541 of the fourth road 540, a fifth path 650 may correspond to the exit lane 551 of the fifth road 550, and a sixth path 660 may correspond to the exit lane 561 of the sixth road 560.

In some aspects of the present disclosure, each of the different paths (e.g., 610, 630, 640, 650, and 660) is ranked based on spline information corresponding to a path of the first detected vehicle 572. In some aspects of the present disclosure, a vehicle perception module 312 of the vehicle behavior planning system 300 of FIG. 3 is mounted within the ego vehicle 420 having the sensor module 302 (e.g., camera/radar/sonar/LIDAR). The vehicle perception module 312 may provide object detection and tracking system functionality to determine a location and a heading of the first detected vehicle 572. In this example, the sixth path 660 is shown to include a past history 662 based on previous locations and headings of the first detected vehicle 572. In some aspects of the present disclosure, the vehicle perception module 312 provides a bounding box, a centroid (and/or front/rear axle location) a heading and velocity points from which a spline representing the sixth path 660 is generated. In addition, the birds-eye-view of the roadway environment 500 may be provided by an aerial drone, a satellite image, a map, or other like visual technique.

In the example shown in FIG. 6, the spline representing the sixth path 660 is determined as the most likely path taken by the first detected vehicle 572. The other splines, associated with the first path 610, the third path 630, the fourth path 640 and the fifth path 650, are determined to be less likely. The various paths (e.g., 610, 630, 640, 650, and 660) may be determined by the vehicle paths determination module 314 of FIG. 3. In addition, the prediction regarding the path likelihood may be performed by the vehicle path prediction module 316 based on a curvature of the splines. For example, the spline representing the sixth path 660 is shown as being relatively smooth (e.g., having a lowest curvature) and generally agrees with the vehicle's current heading based on the past history 662 of previous locations and headings of the first detected vehicle 572. By contrast, the splines representing the other paths (e.g., 610, 630, 640, and 650) exhibit significant curvatures. By evaluating the curvatures of the splines, the vehicle path prediction module 316 can predict which spline represents the path the first detected vehicle 572 is most likely to take, according to some aspects of the present disclosure.

In one aspect of the present disclosure, the motion of the ego vehicle 420 is planned by a vehicle planner (e.g., the vehicle behavior planner 310). In this example, the ego vehicle 420 identifies the sixth path 660 as the path taken by the first detected vehicle 572 to the exit lane 561 of the sixth road 560. This process may be repeated to predict paths for the second detected vehicle 574, the third detected vehicle 576, the fourth detected vehicle 577, the fifth detected vehicle 578, and the sixth detected vehicle 579 within the intersection 570. Once the paths are predicted, the vehicle trajectory planner module 318 may plan a trajectory of the ego vehicle 420 according to the predicted paths, for example, as further described in FIG. 7.

FIG. 7 is a flowchart illustrating a method for vehicle behavior prediction, according to aspects of the present disclosure. The method 700 begins at block 702, in which a vehicle is detected entering an unmarked road segment. For example, in FIG. 5, the ego vehicle 420 has entered the intersection 570 from the first road 510, and the first detected vehicle 572 is identified within the intersection 570 by the ego vehicle 420. In some aspects of the present disclosure, a vehicle perception module 312 of the vehicle behavior planning system 300 of FIG. 3 is mounted within the ego vehicle 420 having the sensor module 302 (e.g., camera/radar/sonar/LIDAR). The vehicle perception module 312 may provide object detection and tracking system functionality to determine a location and a heading of the first detected vehicle 572.

At block 704, a set of exit paths available for the detected vehicle to reach different exit lanes of the unmarked road segment are determined. For example, as shown in FIG. 6, several different paths are determined that the first detected vehicle 572 can take to each of the exit lanes (e.g., 511, 521, 531, 541, 551, and 561) as the first detected vehicle 572 enters the intersection 570. For example, a first path 610 may correspond to the exit lane 511 of the first road 510, and a second path (not shown) may correspond to the exit lane 521 of the second road 520, if the first detected vehicle 572 performed a U-turn. In addition, a third path 630 may correspond to the exit lane 531 of the third road 530, a fourth path 640 may correspond to the exit lane 541 of the fourth road 540, a fifth path 650 may correspond to the exit lane 551 of the fifth road 550, and a sixth path 660 may correspond to the exit lane 561 of the sixth road 560.

At block 706, an exit path taken by the detected vehicle is predicted from the set of exit paths available for the detected vehicle to reach the different exit lanes of the unmarked road segment. For example, in FIG. 6, the spline representing the sixth path 660 is predicted as the most likely path taken by the first detected vehicle 572. The other splines, associated with the first path 610, the third path 630, the fourth path 640 and the fifth path 650, are determined to be less likely. A prediction regarding the path likelihood may be performed by the vehicle path prediction module 316 based on a curvature of the splines. For example, the spline representing the sixth path 660 is shown as being relatively smooth (e.g., having a lowest curvature) and generally agrees with the vehicle's current heading based on the past history 662 of previous locations and headings of the first detected vehicle 572. By contrast, the splines representing the other paths (e.g., 610, 630, 640, and 650) exhibit significant curvatures. By evaluating the curvatures of the splines, the vehicle path prediction module 316 can predict which spline represents the path the first detected vehicle 572 is most likely to take, according to some aspects of the present disclosure.

At block 708, a trajectory of an ego vehicle is planned according to the predicted exit path taken by the detected vehicle to reach a corresponding exit lane of the unmarked road segment. For example, as shown in FIG. 6, the motion of the ego vehicle 420 is planned by a vehicle planner (e.g., the vehicle behavior planner 310). In this example, the ego vehicle 420 identifies the sixth path 660 as the path taken by the first detected vehicle 572 to the exit lane 561 of the sixth road 560. This process may be repeated to predict paths for the second detected vehicle 574, the third detected vehicle 576, the fourth detected vehicle 577, the fifth detected vehicle 578, and the sixth detected vehicle 579 within the intersection 570. Once the paths are predicted, the vehicle trajectory planner module 318 may plan a trajectory of the ego vehicle 420 according to the predicted paths.

The method 700 may predict the exit path taken by the detected vehicle by sensing a curvature of upcoming roads corresponding to the different exit lanes of the unmarked road segment. For example, as shown in FIG. 6, a curvature of the exit lanes (511, 521, 531, 541, 551, and 561) of the first road 510, the second road 520, the third road 530, the fourth road 540, the fifth road 550, and the sixth road 560 is determined. The method 700 further includes ranking the set of paths available for the detected vehicle to reach the different exit lanes of the unmarked road segment based off of the sensed curvatures of the upcoming roads following the different exit lanes. As shown in FIG. 6, prediction of the exit path taken by the first detected vehicle 572 may be based on a curvature of the first road 510, the second road 520, the third road 530, the fourth road 540, the fifth road 550, or the sixth road 560 following the intersection 570.

In some aspects, the method shown in FIG. 7 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102) and/or other components included therein of the autonomous vehicle 150, or the vehicle behavior planning system 300.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for vehicle behavior prediction, the method comprising:

detecting a vehicle entering an unmarked road segment and having a current position in the unmarked road segment;

determining a set of exit paths available for the detected vehicle to reach different exit lanes of the unmarked road segment;

determining a heading of the detected vehicle to enter the unmarked road segment and reach the current position as a past history of the detected vehicle;

generating splines representing predicted paths between the different exit lanes of the unmarked road segment and the current position of the detected vehicle;

selecting a spline having a curvature conforming with the past history of the detected vehicle;

predicting an exit path taken by the detected vehicle as the exit path from the set of exit paths corresponding to the selected spline; and controlling an ego vehicle while following a trajectory planned for the ego vehicle to avoid the detected vehicle moving along the predicted exit path taken by the detected vehicle to direct the ego vehicle to reach an exit lane of the unmarked road segment.

2. The method of claim 1, in which determining heading of the detected vehicle is performed in response to the detected vehicle reaching an intersection.

3. The method of claim 1, in which determining the set of exit paths comprises:

generating a birds-eye-view of the unmarked road segment; and generating the set of exit paths based on the current position and the heading of the detected vehicle relative to the different exit lanes of the unmarked road segment.

4. The method of claim 1, in which predicting the exit path taken by the detected vehicle comprises:

determining a curvature of the different exit lanes of the unmarked road segment in relation to the current position and the heading of the detected vehicle according to the generated splines; and inferring the predicted exit path taken by the detected vehicle as the exit lane having the least curvature according to the generated splines.

5. The method of claim 1, in which predicting the exit path taken by the detected vehicle comprises:

sensing a curvature of the upcoming road segments corresponding to the different exit lanes of the unmarked road segment according to the generated splines; and ranking the set of paths available for the detected vehicle to reach the different exit lanes of the unmarked road segment based off of the sensed curvatures of the upcoming road segments following the different exit lanes according to the generated splines.

6. The method of claim 1, further comprising training a model to predict the exit path taken by the detected vehicle to reach the exit lane of the unmarked road segment based on a curvature of the different exit lanes of the unmarked road segment in relation to the detected vehicle.

7. The method of claim 1, in which detecting comprises:

identifying the vehicle entering an intersection; and sensing a curvature of the upcoming road segments connected to the different exit lanes of the intersection.

8. A non-transitory computer-readable medium having program code recorded thereon for vehicle behavior prediction, the program code being executed by a processor and comprising:

program code to detect a vehicle entering an unmarked road segment and having a current position in the unmarked road segment;

program code to determine a set of exit paths available for the detected vehicle to reach different exit lanes of the unmarked road segment;

program code to determine a heading of the detected vehicle to enter the unmarked road segment and reach the current position as a past history of the detected vehicle;

program code to generate splines representing predicted paths between the different exit lanes of the unmarked road segment and the current position of the detected vehicle;

program code to select a spline having a curvature conforming with the past history of the detected vehicle;

program code to predict an exit path taken by the vehicle from the set of exit paths corresponding to the selected spline; and program code to control an ego vehicle while following a trajectory planned for the ego vehicle to avoid the detected vehicle moving along the predicted exit path taken by the detected vehicle to direct the ego vehicle to reach an exit lane of the unmarked road segment.

9. The non-transitory computer-readable medium of claim 8, in which the program code to determine the current position and the heading of the detected vehicle is performed in response to the detected vehicle reaching an intersection.

10. The non-transitory computer-readable medium of claim 8, in which the program code to determine the set of exit paths comprises:

program code to generate a birds-eye-view of the unmarked road segment; and program code to generate the set of exit paths based on the current position and the heading of the detected vehicle relative to the different exit lanes of the unmarked road segment.

11. The non-transitory computer-readable medium of claim 8, in which the program code to predict the exit path taken by the detected vehicle comprises:

program code to determine a curvature of the different exit lanes of the unmarked road segment in relation to the current position and the heading of the detected vehicle according to the generated splines; and program code to infer the predicted exit path taken by the detected vehicle as an exit lane having the least curvature according to the generated splines.

12. The non-transitory computer-readable medium of claim 8, in which the program code to predict the exit path taken by the detected vehicle comprises:

program code to sense a curvature of the upcoming road segments corresponding to the different exit lanes of the unmarked road segment according to the generated splines; and program code to rank the set of paths available for the detected vehicle to reach the different exit lanes of the unmarked road segment based off of the sensed curvatures of the upcoming roads following the different exit lanes according to the generated splines.

13. The non-transitory computer-readable medium of claim 8, further comprising program code to train a model to predict the exit path taken by the detected vehicle to reach an exit lane of the unmarked road segment based on a curvature of the different exit lanes of the unmarked road segment in relation to the detected vehicle.

14. The non-transitory computer-readable medium of claim 8, in which the program code to detect comprises:

program code to identify the vehicle entering an intersection; and program code to sense a curvature of the upcoming road segments connected to the different exit lanes of the intersection.

15. A system for vehicle behavior prediction, the system comprising:

a vehicle perception module to detect a vehicle entering an unmarked road segment and having a current position in the unmarked road segment;

a vehicle paths determination module to determine a set of exit paths available for the detected vehicle to reach different exit lanes of the unmarked road segment, to determine a heading of the detected vehicle to enter the unmarked road segment and reach the current position as a past history of the detected vehicle, to generate splines representing predicted paths between the different exit lanes of the unmarked road segment and the current position of the detected vehicle, and to select a spline having a curvature conforming with the past history of the detected vehicle;

a vehicle path prediction module to predict an exit path taken by the vehicle from the set of exit paths corresponding to the selected spline; and a vehicle trajectory planner module to control an ego vehicle while following a trajectory planned for the ego vehicle to avoid the detected vehicle moving along the predicted exit path taken by the detected vehicle to direct the ego vehicle to reach an exit lane of the unmarked road segment.

16. The system of claim 15, in which the vehicle perception module is further to determine the current position and the heading of the detected vehicle in response to the detected vehicle reaching an intersection.

17. The system of claim 15, in which the vehicle paths determination module is further to generate a birds-eye-view of the unmarked road segment, and to generate the set of exit paths based on the current position and the heading of the detected vehicle relative to the different exit lanes of the unmarked road segment.

18. The system of claim 15, in which the vehicle path prediction module is further to determine a curvature of the different exit lanes of the unmarked road segment in relation to the current position and the heading of the detected vehicle according to the generated splines; and to infer the predicted exit path taken by the detected vehicle as an exit lane having the least curvature according to the generated splines.

* * * * *